United States Patent [19]

Szczutkowski et al.

[11] Patent Number: 5,077,832

[45] Date of Patent: Dec. 31, 1991

[54] RADIO TRANSCEIVER WITH OPTIONAL DISPLAY

[75] Inventors: Craig F. Szczutkowski; Marc A. Dissosway, both of Forest; Clyde R. Butler, Jr., Lynchburg; Gerald M. Cooper, Gretna, all of Va.

[73] Assignee: Ericsson GE Mobile Communications Inc., Lynchburg, Va.

[21] Appl. No.: 390,242

[22] Filed: Aug. 7, 1989

[51] Int. Cl.[5] ............................................. H04B 1/40
[52] U.S. Cl. .................................... 455/89; 455/90; 455/154; 455/186; 455/349
[58] Field of Search .................. 455/89, 90, 128, 154, 455/158, 346–349, 351, 343, 76, 77, 183, 186; 340/752, 756

[56] References Cited

U.S. PATENT DOCUMENTS

| | | | |
|---|---|---|---|
| 4,254,504 | 3/1981 | Lewis et al. | 455/76 |
| 4,486,624 | 12/1984 | Puhl et al. | 179/2 EB |
| 4,525,865 | 6/1985 | Mears . | |
| 4,718,110 | 1/1988 | Schaefer | 455/90 |
| 4,843,588 | 6/1989 | Flynn . | |
| 4,856,088 | 8/1989 | Oliwa et al. | 455/349 |
| 4,887,311 | 12/1989 | Garner et al. | 455/76 |

FOREIGN PATENT DOCUMENTS

2184308 6/1987 United Kingdom ................ 455/95

OTHER PUBLICATIONS

NEC Electronics U.S.A. Inc., μPD7225 Intelligent Alphanumeric LDC Controller/Driver Technical Manual.

Primary Examiner—Reinhard J. Eisenzopf
Assistant Examiner—Chi H. Pham
Attorney, Agent, or Firm—Nixon & Vanderhye

[57] ABSTRACT

A digitally controller radio transceiver includes a housing including a front cover provided with a display port; a main controller board mounted within the housing; an optional display board attached to an interior surface of the front cover adjacent said display port, said display board electrically connected to said main controller board by a pressure fit connection; a removable display escutcheon plate mounted on an exterior surface of the cover, overlying the display port; and fastening means extending through the cover and connecting the display board to the display escutcheon plate. Removal or omission of the display board is automatically sensed by the radio transceiver's internal microprocessor which operates accordingly. In one embodiment the transceiver program store may be loaded via an external connector to customize the microprocessor instruction code for the presence or absence of a display.

8 Claims, 7 Drawing Sheets

FIG. 7  M-PA MODE

FIG. 8  M-TL MODE

RADIO TRANSCEIVER WITH OPTIONAL DISPLAY

CROSS-REFERENCES TO RELATED APPLICATIONS

This application is related to the following copending commonly-assigned applications filed concurrently herewith:

Ser. No. 07/390,254 of Hodsdon et al and
Ser. No. 07/390,257 of Szczutkowski et al.

The contents of those two related applications identified above are express incorporated herein by reference.

This affliction is also related to commonly-assigned U.S. Pat. application Ser. No. 07/183,212 filed Apr. 19, 1988 in the name of Ingham.

BACKGROUND AND SUMMARY OF THE INVENTION

This invention relates generally to audio transceiver units, and in particular, to a radio transceiver which may be reconfigured relatively easily from one having a display capability to a lower cost version which does not have a display.

The invention also relates to a radio transceiver construction which facilitates the incorporation or omission of a display capability during production.

For marketing and other reasons, manufacturers of radio communications devices typically offer several different configurations for each communications product manufactured. A particular model of radio transceiver may have a "basic" or minimal configuration but may optionally be provided with additional features or "options" at additional cost.

For example, a basic transceiver configuration may provide communications over a limited number of communications channels for basic radio transmitting and receiving functions required by all users. Some users may, however, have additional requirements requiring additional features—such as additional communications channels, receiver channel scanning, display capability and so on. The ability of a manufacturer to provide such additional "options" permits increases in the flexibility, versatility, desirability and range of applications of the product without penalizing purchasers of the basic configuration with increased cost. Purchasers of the basic model pay a minimum price for the minimal configuration, while users requiring additional "option" features pay an increased price based on the number and type of options required.

In the past, additional options were generally provided by incorporating additional components and circuitry into the device. For example, in the past, channel scanning capability or additional operating channels were added by installing additional frequency selection circuitry into the transceiver. Similarly, the tone activated squelch option typically required an additional tone decoder circuit to be installed. Transceiver designers used modular architectures to accommodate additional plug-in "option modules".

An example of this design approach is the prior art "MLS" series radio transceivers manufactured for General Electric Company by Japan Radio Corp. These "MLS" transceivers include basic transceiver circuitry disposed within a housing. The front . panel assembly of the transceiver housing was manufactured separately, and consists of a separable front panel "escutcheon" plate( also referred to as a control panel). Mechanically mounted to the escutcheon plate or control panel is a printed circuit board which plug-connects to the basic transceiver circuitry when the escutcheon plate is mechanically fastened to the housing. The escutcheon plate and associated printed circuit board comprises a module separable from the transceiver main housing and basic circuitry. The module includes user controls mounted on the escutcheon plate and circuitry required to connect user controls mounted on the plate to the transceiver circuitry.

Since different "option" features in many cases require different additional user controls, different models of escutcheon plate modules were produced for the "MLS" series transceivers. In particular, the "MLS" transceiver was made available in five different versions: (1) a two-channel "basic" version; (2) an 8-channel version with the scan feature; (3) a 16-channel version without scan; and (4) a 16-channel version with scan feature. Five different interchangeable escutcheon plates with different user control arrangements corresponding to these five different transceiver versions were also made. The particular escutcheon plate/control panel installed on a particular "MLS" transceiver limited the transceiver features the user could access. For example, the escutcheon plate corresponding to the "MLS" transceiver versions with 16-channel capability and no scan feature does not have a control to actuate the scan feature—preventing the user from obtaining the benefit of the scan feature. Similarly, the escutcheon plates corresponding to the 8-channel transceiver versions do not include user controls to access more than 8 channels.

Since all "MLS" transceivers included identical basic transceiver circuitry and main housing, reduced manufacturing costs and increased reliability derived from large scale manufacturing were obtained. Specific purchaser selected options could be provided in a particular unit simply by installing the appropriate escutcheon plate module—a procedure which could be performed in the field if desired. Incorporation of the circuitry performing the option functions and user controls interacting with such circuitry within the same front panel escutcheon plate module permitted a transceiver to be reconfigured by simply "unplugging" one module and "plugging in" a different module (further increasing reliability and decreasing manufacturing costs).

Commonly assigned U.S. Pat. application Ser. No. 07/183,212 filed Apr. 19, 1988 identified above discloses an improvement in which escutcheon plates need not carry additional circuitry providing additional functionality but instead carry different user control configurations and associated corresponding security circuits. The transceiver microprocessor expects a certain user control configuration based on the type of security circuit installed, and disables software-controlled transceiver functions not corresponding to the expected control configuration.

It is also generally known to load a transceiver personality EEPROM via an external connector, see, e.g., commonly assigned U.S. Pat. No. 4,525,865 to Mears and U.S. Pat. No. 4,843,588 to Flynn.

Further improvements are possible, however. Most "full-featured" digital radio transceivers nowadays include an alphanumeric display (e.g., an LCD display panel) because of the variety of different information that must be displayed. Transceivers in the past needed only to display a few indications (e.g., channel number, on/off status and transmit/receive status). Modern digital "programmable" transceivers offering advanced, user-configurable features such as DTMF dialing with a stored telephone number list, selection between different operating modes, and scanning of user-selectable channel numbers. Such modern transceivers by necessity must provide informative displays—for the user otherwise would become "lost" in the user interface provided by the transceiver and could not effectively "program" his selections. The additional flexibility and power provided by such advanced communications functions (and the "user-friendly" invocation of such functions using an alphanumeric display panel) have become absolutely essential in many communications applications. It is now, for example, possible to equip a police supervisor with a handheld radio transceiver offering critical features, functionally and flexibility not even available to many main dispatchers only a few years ago. This additional communications flexibility permits a public service force to respond more rapidly and efficiently to emergency situations.

On the other hand, some users only require relatively limited functionality from their radio transceivers and would only be confused by (or are not willing to pay for) additional features. An LCD display assembly is a rather costly component and therefore substantially increases the price of a radio transceiver. It has become difficult to design a full featured transceiver without a display for most applications, because many users now demand and require a display and the associated functionality it facilitates.

It is an important object of this invention to provide a radio transceiver design which facilitates production and/or which permits quick conversion of an otherwise standardized transceiver design from one which includes a display to one which does not have a display.

In accordance with one aspect of the present invention, a standardized radio transceiver can be produced with all of the internal circuitry and components (and associated functionality) required for a full-featured premium model with the available optional features incorporated therein, including an electronic display, such as, for example, an LCD or LED display. This premium model includes a housing formed with a display port, an internal display board and an associated display escutcheon plate. To produce a lower cost version, or to convert this model to a lower cost version having no display capability, all that is required is to remove (or not install) the display board and display escutcheon plate, and replace the latter with (or install as an original component) a blank escutcheon plate (preferably plastic). Since the display board is connected to a main controller board by a conventional flex interconnect (or other modular connector), the display board is easily removed (or omitted), while retaining substantially full operational use of the main controller board (without the display).

In accordance with a further aspect of the present invention, removal (or omission) of the display components is automatically sensed by the transceiver's internal microprocessor. If the microprocessor senses the display components are present, it operates in a mode providing a display interface and associated additional functionality. If, on the other hand, the microprocessor senses the display components are absent (or have failed), the transceiver could be enabled to operate in a different mode which provides less functionality not requiring a display interface. Thus, identical transceiver main controller circuitry can be used for transceiver versions with display components and for transceiver versions without display components. This has the advantage of allowing for a lower cost version of an otherwise standard transceiver to be built using common parts (controller board, mechanical housing, FR section, etc.)—and perhaps more importantly, using identical controller circuitry and programming, merely by removing or not installing the display board. Only one version of the controller circuitry needs to be manufactured, since this circuitry automatically adapts to the presence or absence of display components. Only a few simple operations on the manufacturing floor (e.g., install or not install a display board) are required to provide different transceiver versions with completely different functionalities and characteristics.

It is thus a further feature of the invention that the microprocessor based controller hardware is designed to allow operation with or without a display, and the microprocessor senses when no display is present to determine that the radio is of a certain type, i.e., a non-display version.

It is another feature of the invention that in the event a different keypad and control panel is to be used in a non-display version of the transceiver, these elements are likewise easily changed to suit the customer's requirements.

In one exemplary embodiment, a display board incorporating the display unit, display driver IC and other supporting components, is mounted to an interior surface or back side of a front cover of the transceiver housing. The display board is secured by four screws which are inserted from the interior of the housing cover, and which extend through holes in the cover into threaded bores formed in the display escutcheon plate. It will thus be appreciated that by removing these screws, both the display board and the display escutcheon plate may be separated from the transceiver unit front cover. The display board may then be separated from the main controller board by disconnecting the flex interconnect. Upon fastening a blank escutcheon plate over the display area or port of the front cover, using four screws, the reconfiguration to a non-display version is completed.

In the event a different front control panel is also required for the reconfiguration procedure, interchangeable panels are provided for quick connect/disconnect from the transceiver housing. The manner in which this is accomplished is the subject of commonly owned copending application Ser. No. 07/390, 254, filed concurrently herewith, the subject matter of which is incorporated herein by reference.

Additional objects and advantages of the invention will become apparent from the detailed description which follows.

DETAILED DESCRIPTION OF THE DRAWINGS

Figure 1:
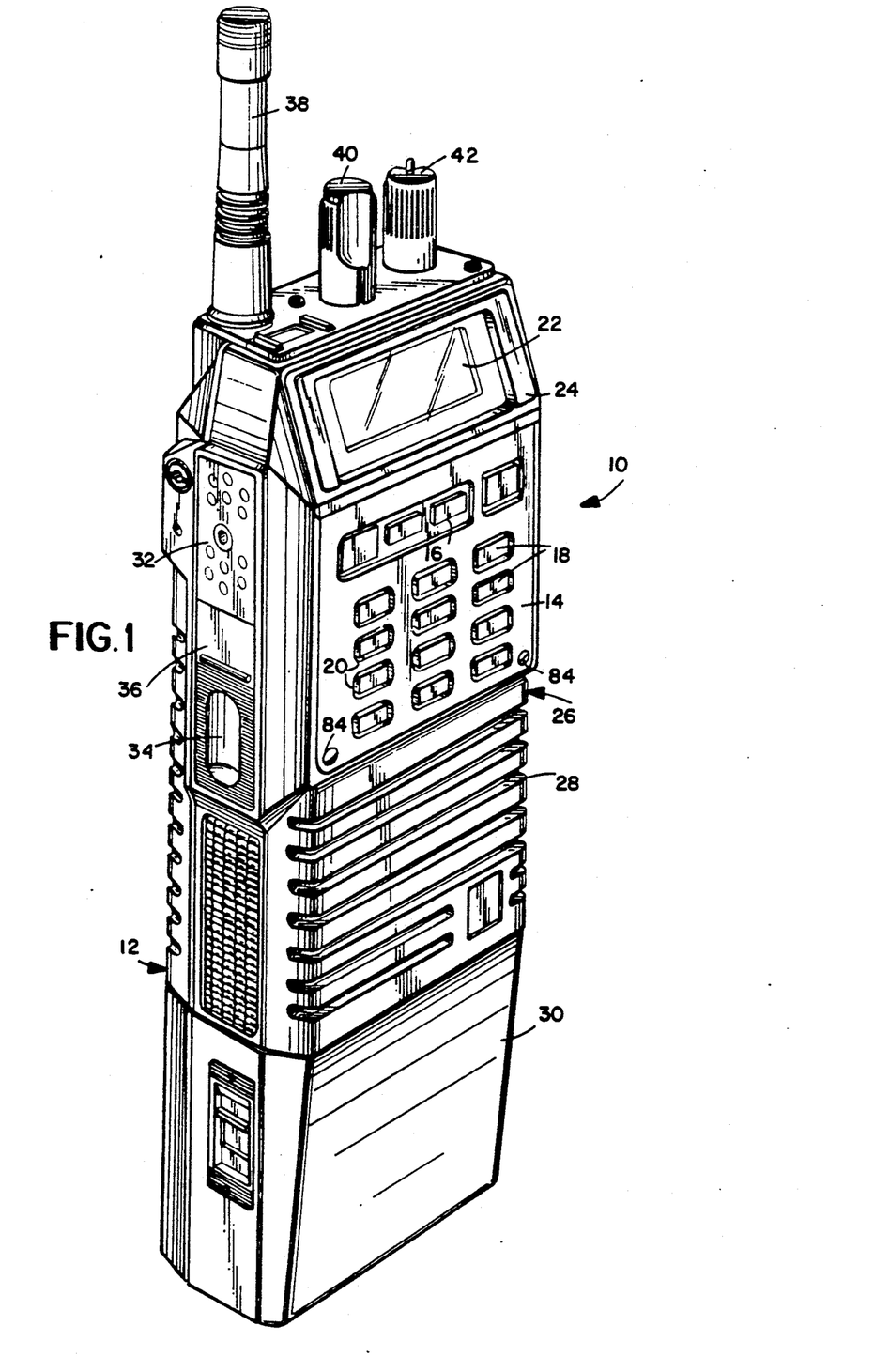
FIG. 1 is a perspective view of mobile transceiver unit incorporating the features of the present invention.

With reference to FIG. 1, a multi frequency, radio transceiver unit 10 includes a metal housing 12 (which is preferably aluminum) having a front control panel 14 overlying a DTMF rubber keypad 16. The pad 16 has a number of individual keys 18 which are shown projecting through a corresponding plurality of apertures 20 in the control panel 14. A display board (or module) 22 is mounted within an upper portion of the housing 12 for viewing messages, channel names, status indicators, etc. A display escutcheon plate 24 is secured to the front cover 26 of the housing in a manner described in further detail herein below.

A speaker grill 28 (which overlies a speaker and microphone not shown) is incorporated into the housing 12, directly below the control panel 14. A battery pack 30 is operatively attached to the lower portion of the housing, and is easily connected/disconnected for replacement of batteries as needed.

Other features and/or components include a programmer connector 32, a transmit button 34, monitor button 36, antenna 38, volume control knob 40 and frequency selector knob 42.

Figure 2:
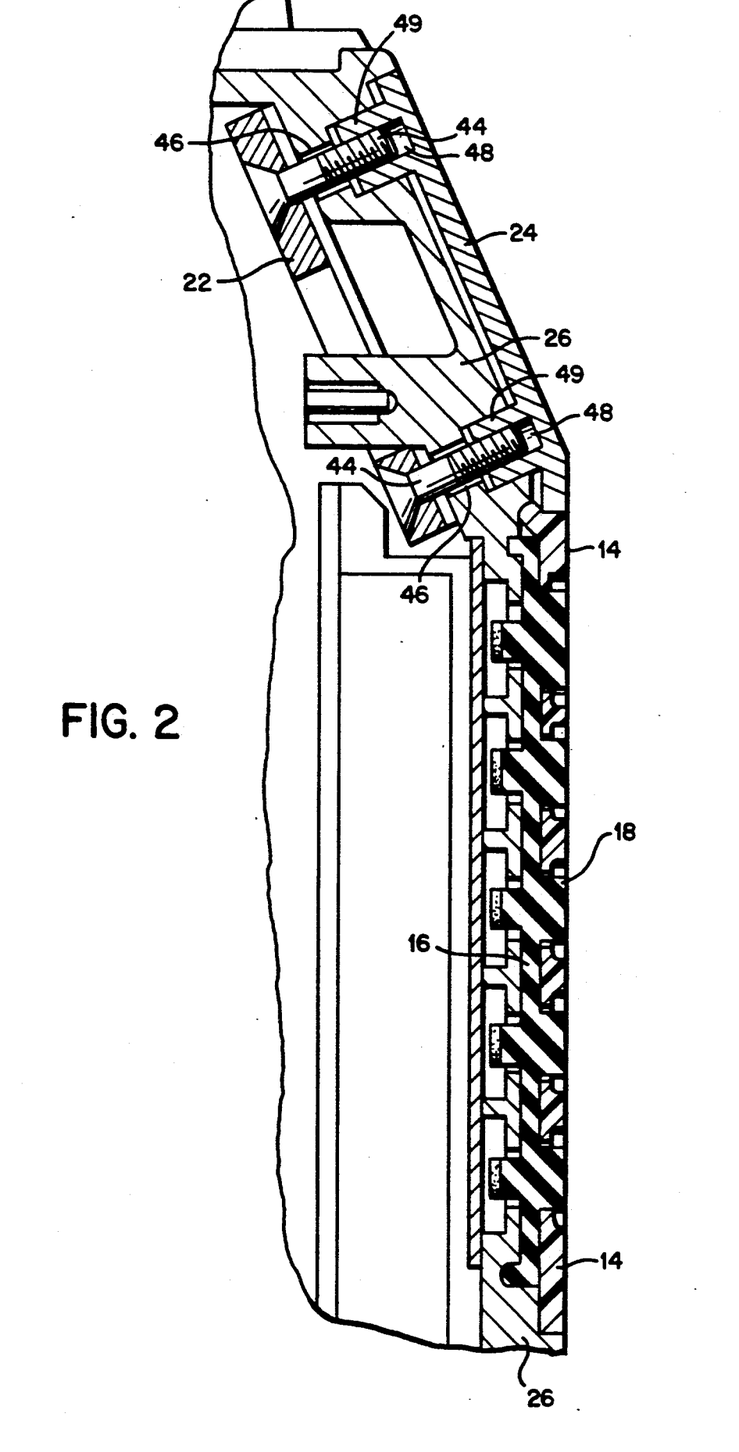
FIG. 2 is a side view, partially in section, illustrating a display board and associated display escutcheon plate in accordance with the invention.

The display board 22 is fastened to the interior or back side of the cover 26, while the display escutcheon plate 24 is mounted on the exterior or front side of the cover 26, in vertical alignment with a display port 27 formed in the cover, With specific reference to FIG. 2, the display escutcheon plate 24 and display board 22 are secured on opposite sides of the front cover 26 by four retaining screws 44 (only two of which are shown in FIG. 2) which are inserted through the display board 22, front cover 26 (via smooth bores 46 best seen in FIG. 3) and into threaded bores 48 provided in respective rearwardly projecting bosses 49 formed in the escutcheon plate, located at the respective corners of the plate.

To remove the board 22, screws 44 are removed, releasing both the escutcheon plate 24 and display board 22 from the front cover 26. Upon disconnection of the display board from the main controller board, via the flex interconnect, the entire display unit may be removed.

Figure 3:
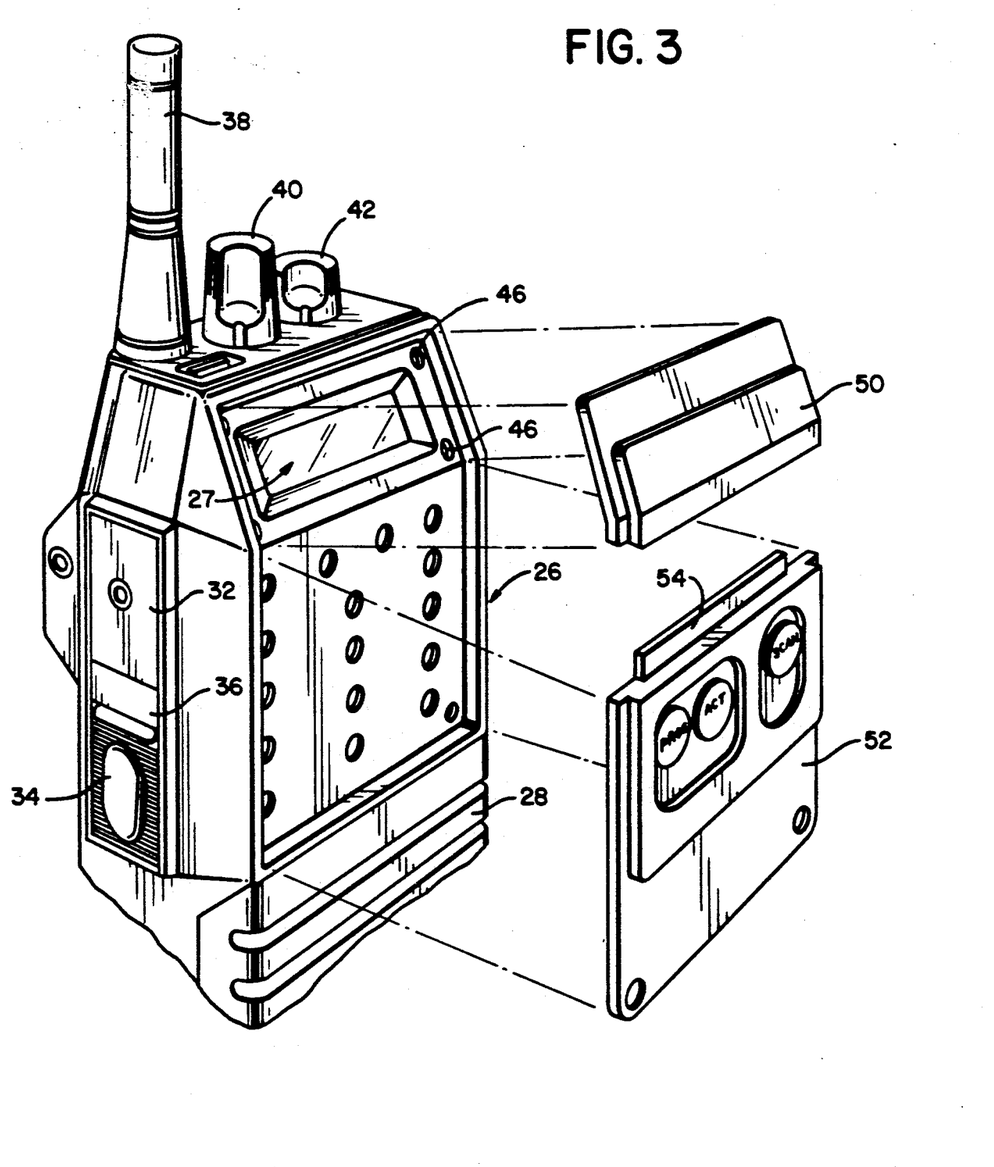
FIG. 3 is a partial exploded view of the housing front cover, interchangeable blank escutcheon plate and interchangeable control panel in accordance with the invention.

With reference to FIG. 3, a blank escutcheon plate 50 is illustrated which may be secured to the front cover 26 of the housing 12 in place of the display escutcheon plate 24. Plate 50 has a generally similar shape to that of the display plate 24, and is provided with a substantially identical edge and screw hole configuration so that it may be secured to the cover 26 in the same manner as the display plate. Thus, screws 44 (or slightly longer screws if necessary) are utilized to secure the plate 50 to the cover 26 via holes 46 and threaded bores (not shown) in the blank plate 50.

Also shown in FIG. 3 is an alternatively configured control panel 52 which may be utilized in place of the panel 14 in the event that, as part of the reconfiguration, the numerical keys of the keypad (for example), are also to be omitted. As previously mentioned, the manner in which panel 14 may be removed and panel 52 (or other differently configured, but interchangeable, panel) attached is disclosed in commonly owned copending application Ser. No. 07/390,254.

For purposes of this invention, it is sufficient to note that the control panels 14 and 52 are provided with a locking bar 54 which extends across all or at least a part of the upper edge of the panel, and which upon assembly, is inserted upwardly into a recessed area formed by the front cover 26, keypad 16 and display (or blank) escutcheon plate 24 (or 50). It will therefore be appreciated that the escutcheon plate 24 (or 50) assist in securing whichever control panel is employed.

It will be appreciated that from a manufacturing standpoint, the production of a lower cost version of the otherwise standardized radio transceiver design is achieved merely by omitting the display board 22 and display escutcheon plate 24 (and panel 14 is applicable) and installing the blank escutcheon plate 50 (and control panel 52 if applicable), but without having to change or alter the main controller board.

Briefly, transceiver 10 includes conventional microprocessor based digital and digitally controlled circuitry for generating modulated RF signals for radiation by antenna 38 and for receiving and demodulating RF signals received by the antenna. A conventional frequency synthesizer circuit internal to transceiver 10 determines the RF transmit and receive frequencies under control of digital signals produced by an internal microprocessor 152. Push-To-Talk (PTT) switch 34 controls the transmit/receive mode of transceiver 10, and display 22 (if present) displays channel, status and other information. In the transceiver configuration shown in FIG. 1, the user may further control the functions of the transceiver by depressing one or more keys 18 provided on the transceiver front panel. As mentioned previously, on/off control and volume controls performed by knob 40, while a further knob 42 can be operated to control RF channel selection by the microprocessor.

Figure 4:
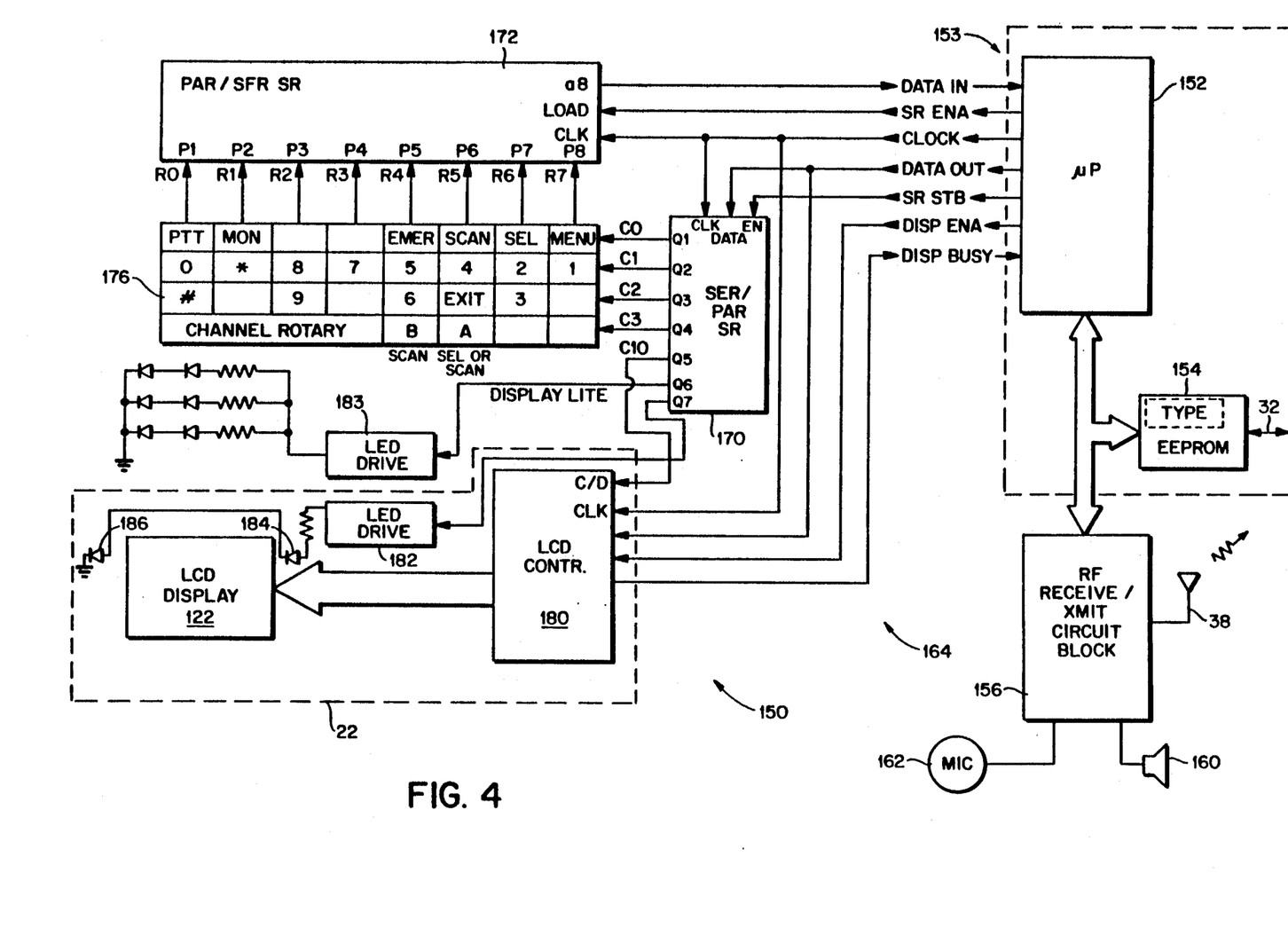
FIG. 4 is a schematic block diagram of exemplary digitally-controlled circuitry of transceiver 10 shown in FIG. 1 and including a main controller board.

FIG. 4 is a schematic block diagram of exemplary transceiver circuitry 150. Transceiver 10 includes a microprocessor 152 (preferably including an internal read only memory type program store, not shown) and a "personality defining" non-volatile memory device 154, both of which are mounted on a main controller board 153. The program memory could also be an externally programmable EPROM, EEPROM, or other similar non-volatile programmable or reprogrammable memory device coupled to connector 32. Using such a programmable device allows the upgrading or reloading of the microprocessor program memory merely by connecting a programming device to the external UDC connector 32 and downloading new executable code into the memory. This technique eliminates the need for opening the radio and removing and replacing the memory chip or microprocessor chip to upgrade the program code. This technique may thus be used if desired to load program control instructions requiring a display board 22 in to transceivers 10 having such a display board and to load program control instructions not requiring a display board into transceivers having no display board.

The transceiver 10 circuitry further includes RF circuitry block 156 coupled to RF antenna 38, a loud speaker 160, a microphone 162, a user control interface circuit 164, and display board ("module") 22. Microprocessor 152 controls the operation of RF circuitry 156 in a conventional manner by applying digital signals to and receiving digital signals from the RF circuitry. RF circuitry 156 (which in a preferred embodiment includes a conventional digitally controlled frequency synthesizer) receives and demodulates RF signals, and generates, modulates and transmits RF signals—all at RF frequencies specified by microprocessor 152 under program control (e.g., at operating frequencies determined by data stored in PROM 154, which could also be a battery backed-up RAM memory).

User control interface circuit 164 in a preferred embodiment includes a matrix type keyboard scanner arrangement. This scanning arrangement includes a shift register 170 for generating scanning signals and applying the scanning signals to electrical contacts associated with keys 18. A further shift register 172 reads switch states from the keypad switch contacts and provides an indication of those states to microprocessor 152. In a preferred embodiment, the electrical contacts associated with keys 18 are arranged in a so-called "matrix" 176 of eight rows (R0-R7) and four columns (C0-C3). Microprocessor 152 typically performs keyboard scanning by writing serial data bytes to the serial input of parallel-to-serial converter shift register 170. A conventional serial data write routine performed by microprocessor 152 causes shift register 170 to propagate an active low bit value successively to outputs C0 (Q1), C1 (Q2), C2 (Q3), and C3 (Q4). The Q5 output of shift register 170 selects the operational mode (command or data) of display module 22 (if present), the Q6 output controls the state of backlight LEDs for display 122, and the Q7 output provides control over LED backlights for the keypad (or to provide a scan indicator for the M-TL configuration if desired).

Display module 22 connects to microprocessor 152 by an electrical connection of the flex-type circuit board to the display module 22. In a preferred embodiment, the flex circuit is pressure fit- or clamped to the appropriate connection fingers on the display board to provide the electrical connection. Disconnection of the display module 22 from microprocessor 152 (and associated controller circuitry) does not permit any of the microprocessor signal lines to contact ground potential or other signal line potentials. As described previously, installation of the display module 22 is mostly a matter of mounting the display module to the inside of the transceiver 10 chassis using fasteners, and then connecting the display module to the microprocessor and associated controller circuitry via the pressure or clamp-type connection described above.

Display module 22 in a preferred embodiment includes a conventional LCD controller 180 (e.g., type uPD7225 manufactured by NEC Electronics) and a conventional LCD panel-type display 122. In the preferred embodiment, controller 180 receives serial data signals from microprocessor 152 over the MICROPROCESSOR DATA OUT line, converts those serial data signals into LCD display driving signals in a conventional manner, and applies the driving signals to produce a display on LCD display 122. In a preferred arrangement, an additional LED drive 182 may selectively provide, LCD back light control signals (under microprocessor 152 control) via a Q6 output of shift register 170 to illuminate LCD back light LEDs 184, 186.

Figure 5:
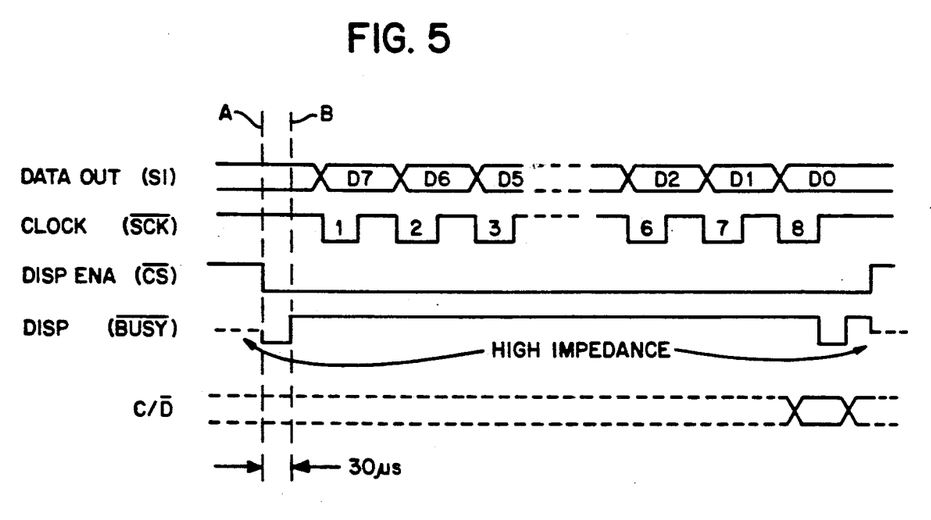
FIG. 5 is a timing diagram of exemplary signals communicated between the microprocessor and the LCD controller shown in FIG. 4.

As mentioned above, microprocessor 152 provides data to controller 180 via the microprocessor DATA OUT line. However, this DATA OUT line is not dedicated to display module 22, but rather is used by the microprocessor to communicate with various other transceiver components (including, for example, shift register 170). Accordingly, an additional control line DISP ENA ("display enable") is dropped to an active low level to enable controller 180 (in the preferred embodiment, this control line is connected to the controller "Chip Select" input) FIG. 5 is a schematic timing diagram of exemplary control signals exchanged between microprocessor 152 and controller 180 in the preferred embodiment. To write data to controller 180 for display, microprocessor 152 first writes appropriate data to ensure that the C/D line (CQ5) output of shift register 170 selects "data" rather than "control" made for controller 180, and then microprocessor 152 asserts the (active low) DISP ENA signal. In response to this (edge "A", FIG. 5) active low DISP ENA signal level, controller 180 activates its normally inactive tristate DATA OUT line generates an active low level on this line for about 30 microseconds and then pulls the line up to logic level 1 (FIG. 5, edge "B"). Microprocessor 152 begins to transmit serial data on its DATA OUT line (this serial data represents information to be displayed on display 122) When controller 180 receives the data, it again asserts its (active low) DISP BUSY signal (which is normally "pulled up" within controller 180 except when active low) to inform microprocessor 152 that it is busy receiving and processing that data. Controller 180 continues to assert DISP BUSY signal in the preferred embodiment until it is "done" handling the data last transmitted to it by microprocessor 152 so that the microprocessor does not attempt to send additional data to the controller 180 before the controller is ready to receive and handle it.

Figure 6:
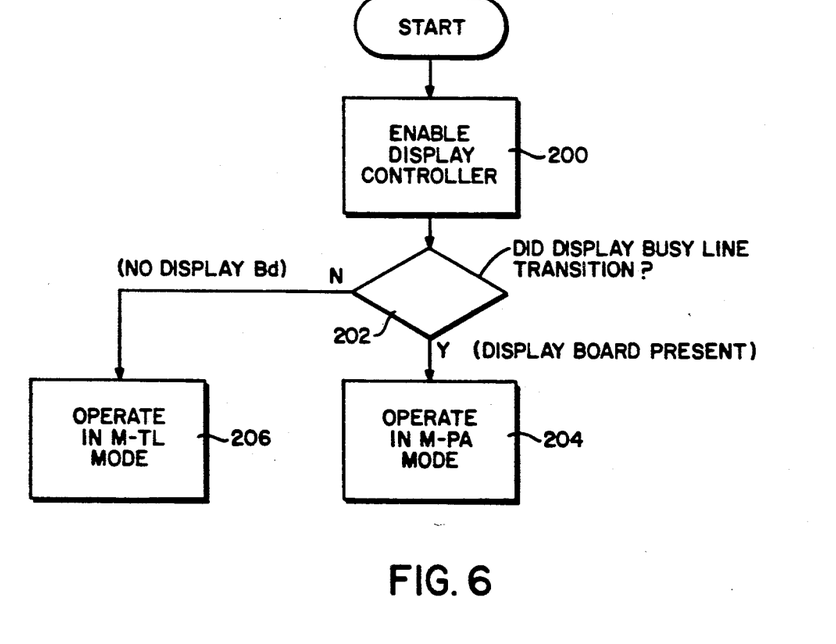
FIG. 6 is a schematic flow chart of exemplary program control steps related to display processing performed by the microprocessor shown in FIG. 4.

In the preferred embodiment, microprocessor 152 determines whether display module 22 is present or not by enabling the display module (by asserting the active low DISP ENA line) and then testing whether the DISP BUSY line is asserted in response. Referring to FIG. 6 (a schematic flow chart of exemplary program control steps performed by microprocessor 152 in the preferred embodiment to determine whether display module is present or absent), microprocessor 152 first asserts the DISP ENA line (block 200) and then monitors the DISP BUSY line. If display module 22 is present, controller 180 will responsively assert the DISP BUSY line. If display module 22 is not present, on the other hand, the state of DISP BUSY line will not change. If microprocessor 152 detects that the DISP BUSY line has transitioned, it concludes that display module 22 is present and begins operating in a full-featured mode known as M-PA (block 204). If microprocessor 152 detects no transition of the DISP BUSY line, on the other hand, it operates instead in a mode offering more limited functionality known as M-TL (block 206). In the preferred embodiment, the test performed by decision block 202 may, if desired, be reiterated several times before- block 206 selects the M-TL mode in order to prevent the transceiver from erroneously entering an improper mode of operation.

It will be appreciated that decision block 202 will detect not only the presence or absence of display module 22, but also whether the display module is functional or not. That is, a display module 22 present within transceiver 10 which has failed such that it no longer asserts the DISP BUSY line in response to signals sent to it by microprocessor 152 will be treated by decision block 202 as if the display module is not installed within the transceiver (thus causing the transceiver to operate in the lower functionality M-TL mode). This feature of the operation of the preferred embodiment may have advantages, since it is typically not possible to maintain the high functionality of the M-PA mode without use of a display (as will now become apparent).

Figure 7:
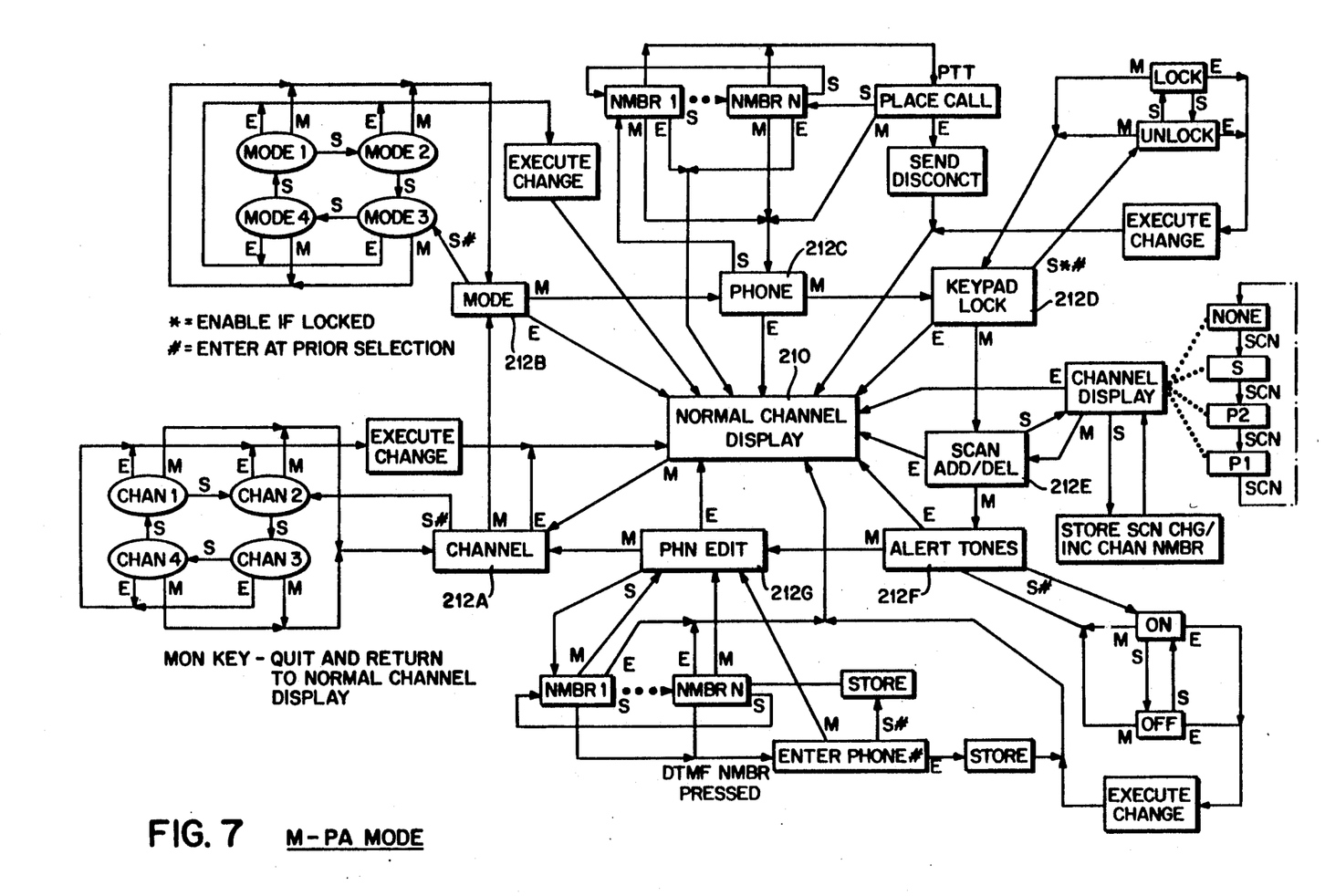
FIG. 7 is a schematic diagram of user interface modes presented to the user via keypad 14 and LCD display 122 in the transceiver configured as shown in FIG. 1.

FIG. 7 is a schematic state diagram of different user input states provided by the FIG. 1 transceiver during transceiver operation in the M-PA mode. The "normal" state of transceiver 10 is to display a currently selected operating channel on display 122 (block 210). Depressing a "M" ("menu") key selects different user input states 212. Each of user input states 212 permits the user to input different parameters into transceiver 10, and most of these user input states require display 122 for effective interfacing between the user and the transceiver 10. For example, in the channel state 212A, depressing a further SELECT ("S") causes microprocessor 152 to display a particular channel selection which the user may then alter by again depressing the select key. Once an appropriate channel is displayed on display 122, the user may then depress the EXIT ("E") key to execute the change and thus provide operation on a new operating channel. Similarly, phone edit state 212G permits the user to review previously inputted and stored phone numbers on display 122 and permits the user to enter new phone numbers and store same into the transceiver's non-volatile memory 154. This function is difficult or impossible to perform without a display 122 for displaying the previously stored phone numbers.

Figure 8:
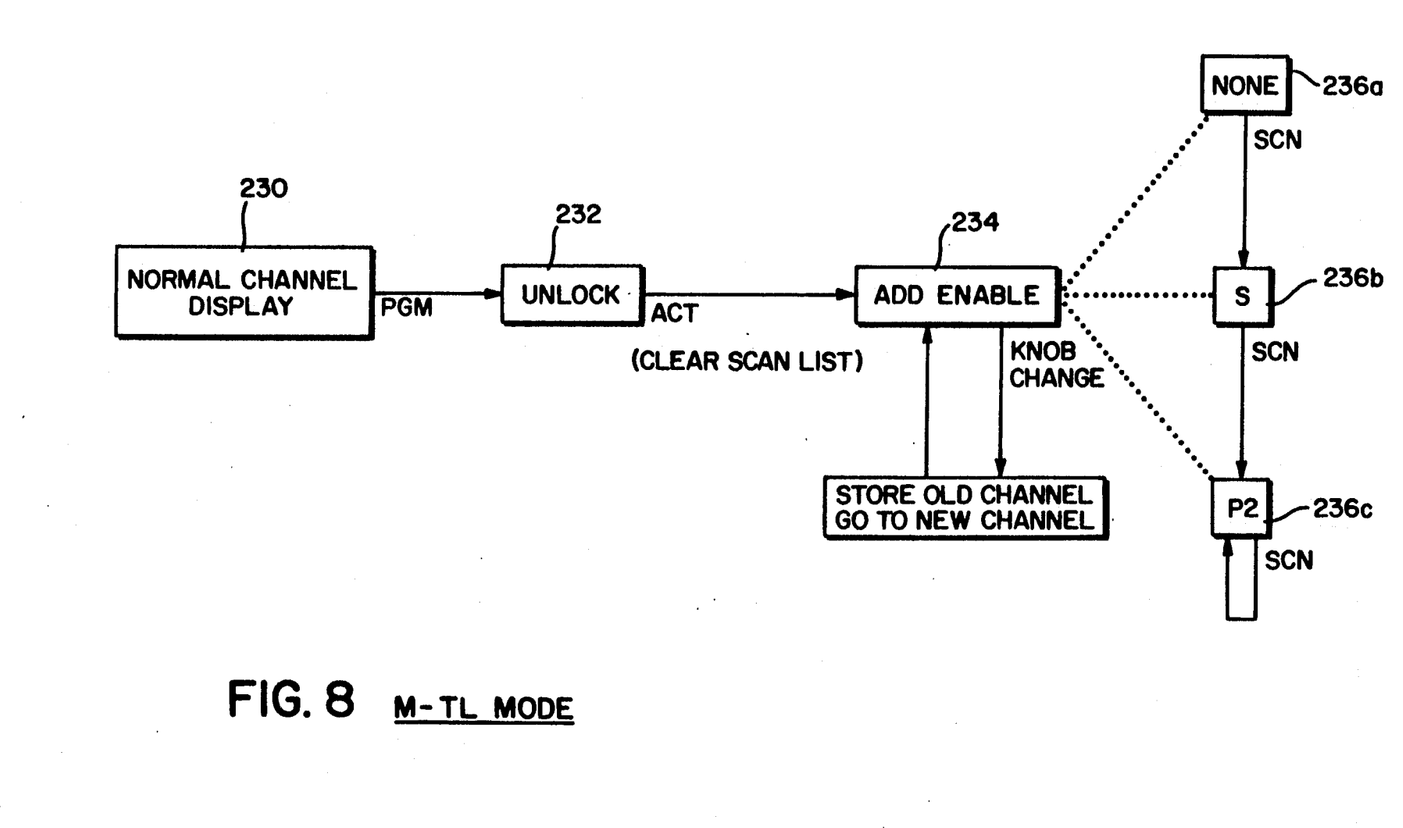
FIG. 8 is a schematic state diagram of user interface states presented to the user by the transceiver when a LCD display module is removed from (or not installed in) the FIG. 1 transceiver.

FIG. 8 is a schematic state diagram of the more limited M-TL mode of operation. As is shown in FIG. 3, the M-TL configuration in the previous embodiment, includes a keypad with only three keys: PGM, ACT and SCN. These three keys are provided to permit the user to input a channel scan list via channel selector knob 42. The normal "channel display" state 230 shown in FIG. 8 is really a non-display state if display module 22 is absent. By depressing PGM key, the user unlocks the other two keys (state 232). By then depressing the ACT key, the user clears the previously entered scan list (the entire scan list must be cleared because there is no display 122 to permit the user to selectively review and change the previous entries). The user may then "build" a channel scan list by selecting channels using knob 42 and striking the SCN key (blocks 234, 236).

Of course, the M-TL and M-PA modes of transceiver 10 operation share a great deal of functionality in terms of channel scanning as well as in performing various other functions required by transceiver 10 (e.g., receiving and transmitting RF signals in accordance with information stored in personality PROM 154, responding to pre-programmed tone squelch signals, etc.). The main difference between the M-TL and M-PA operational modes is that the M-TL mode has a much more limited user interface capability because of the absence of display 122.

In the preferred embodiment, personality PROM 154 typically stores a byte of information indicating transceiver type. This TYPE information may be used alternately to (or in conjunction with) the exemplary program control steps shown in FIGURE 6 to determine whether transceiver 10 is configured with an display module 22. In the preferred embodiment, information is downloaded into personality PROM 154 just before the transceiver is provided to a purchaser, such information specifying various purchaser-specific information (e.g., operating frequencies, transceiver identification, authorized groups/individuals the transceiver may communicate with, etc.). An additional byte of information also downloaded in the preferred embodiment identifies the transceiver type (e.g., to permit the conventional programming device used to develop and download the information into PROM 154 to configure that information appropriately). Microprocessor 152 may, if desired, read that TYPE byte of information to determine whether or not transceiver 10 is equipped with a display, and then begin operating in the M-TL mode based on this TYPE information rather than on the detected failure of controller 180 to assert the DISP BUSY line. These two alternate techniques are not, of course, equivalent to one another. For example, if incorrect TYPE information was downloaded into PROM 154, transceiver 10 might begin operating in M-TL mode (even though it was equipped with a display module 22) or vice-versa if it bases its determination solely on the contents of PROM 154 rather than on the actual detection of the presence or absence of a display module 22. However, it would be relatively difficult for a user to obtain and install a display module 22 in order to upgrade his transceiver 10 after purchase, and the additional user interface functionality provided by operation in M-PA is virtually worthless unless a display module 22 is present.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A digitally controlled radio transceiver optionally including an internal visual display module, said transceiver comprising:

connector means for connecting to said display module; and a digital controller connected to said connector means, a said controller including;

user interface means or alternately providing first and second user interface modes, said first user interface mode requiring cooperation with said display module for viewing prompts necessary for controllably operating said transceiver, said second user interface mode not requiring cooperation with said display module for controllably operating said transceiver, said user interface means including:

first mode means preprogrammed for providing display of a first set of control selection prompts via said display module and for accepting user control inputs from said keypad means so as to provide a first set of functions, and second mode means preprogrammed or providing no display of control selection prompts via said display module and for accepting user control inputs rom said keypad means so as to provide a second set of functions different from said first set;

testing means connected to said connector means for determining whether said display module is connected to said connector means, and mode selection means, including means for selecting between said first and said second mode means, connected to said testing means and to said user interface means for controlling said user interface means to provide said first user interface mode if said testing means deter..ines said display module is present and for controlling said user interface means to provide said second user interface mode i said testing mean determines said display module is not present.

2. A transceiver as in claim 1 wherein:
said display module includes means for generating signal transitions; and
said testing mean comprises means for sensing the occurrence of said signal transitions.

3. A digitally controlled radio transceiver as in claim 1 further including:
a housing having an outer surface;
memory means disposed in said housing and connected to said digital controller or storing program control instructions; and
eternal connector means disposed on said housing outer surface and coupled to said memory means for receiving said program control instructions and for storing said instructions in said memory means.

4. A digitally controlled radio transceiver optionally including an internal visual display module, said transceiver comprising:
housing means defining an interior space and an outer surface, for housing a control module and for optionally housing said internal visual display module therein;
disengageable electrical connection means disposed within said housing for optionally electrically connecting to said display module;
electric switch means disposed on said housing outer surface for converting mechanical energy into electrical signals; and
microprocessor means, disposed in said housing, coupled to said connection means and connected to receive said electric switch means electrical signals, said microprocessor means for:
determining whether or not said connection means is connected to a display module,
if said determining means determines said connection means is connected to a display module, providing a first user interface mode including displaying prompts necessary for controllably operating said transceiver via said display module and processing user inputs from said electric switch means responsive to such prompts,
if said determining means determine said connection means is not connected to a display module, providing a second user interface mode including displaying no prompts via said display module and processing user inputs from said electric switch means,
said transceiver means further includes memory means coupled to said microprocessor means or storing personality parameters, said personality parameters including a TYPE parameter indicating whether said transceiver is equipped with said display module; and
said determining means is responsive to said TYPE parameter stored by said memory means.

5. A transceiver as in claim 4 wherein:
said connector means includes signal line means for connecting said display module to said microprocessor means;
said display module includes means for changing the state of said signal line means; and
said determining means includes testing means connected to said signal line means for determining the occurrence of a change of state of said signal line means.

6. A digitally controlled radio transceiver assembly kit including
an optional visual display module;
housing means, defining an interior space and an outer surface, for housing a control module and for optionally housing said visual display module therein;
connector means disposed within said housing for optionally electrically connecting to said display module;
first keypad means disposable on said housing outer surface for accepting a first set of user inputs corresponding to a first operational mode requiring the presence of said display module;
second keypad means disposable on said housing outer surface for accepting a second set of user inputs different from said first set, said second user inputs set corresponding to a second operational mode not requiring the presence of said display module; and
microprocessor means, disposed in said housing, coupled to said connector means and adapted for coupling to either of said first and second keypad means, for
determining whether or not said connector means is connected to a display module,
if said determining means determines said connector means is connected to a display module, operating in said first operation mode in cooperation with said first keypad means and said display module, and
if said determining means determines said connector means is not connected to a display module, operating in said second operation mode in cooperation with said second keypad means.

7. A kit as in claim 6 wherein:
said connector means includes signal line means for connecting said display module to said microprocessor means;
said display module includes means for changing the state of said signal line means; and
microprocessor includes testing means connected to said signal line means for determining the occurrence of a change of state of said signal line means.

8. A kit as in claim 6 wherein:
said kit further includes memory means coupled to said microprocessor means for storing personality parameters, said personality parameters including a TYPE parameter indicating whether said transceiver is equipped with said display module; and
said microprocessor includes determining means responsive to said TYPE parameter stored by said memory means for determining whether said display module is present.

* * * * *